Dec. 22, 1942.  L. J. MULLEN  2,306,076
INSECTICIDE HOLDER FOR ANIMALS
Filed Nov. 18, 1941
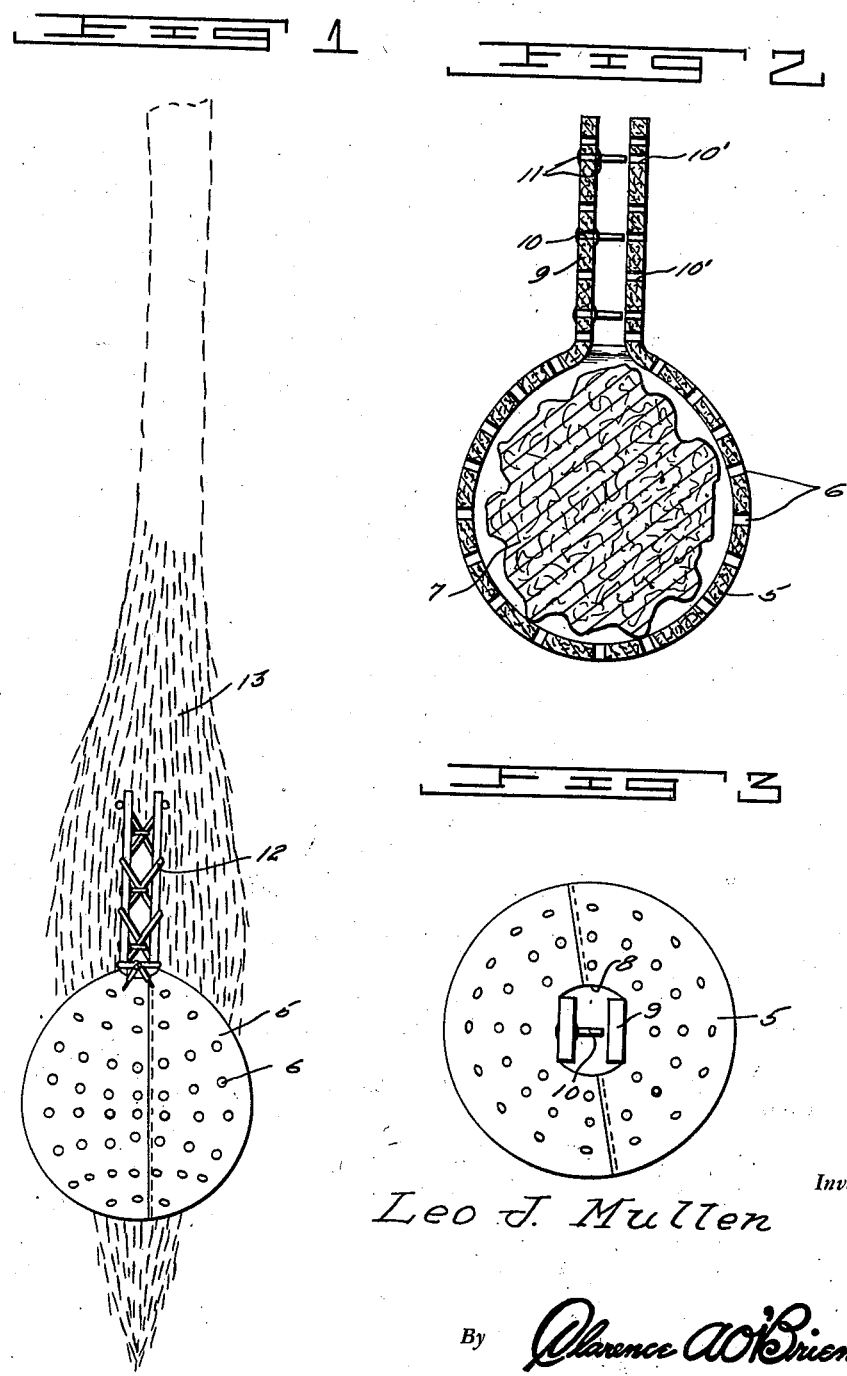
Inventor
Leo J. Mullen
By Clarence A. O'Brien
Attorney Patented Dec. 22, 1942

2,306,076

UNITED STATES PATENT OFFICE 2,306,076

INSECTICIDE HOLDER FOR ANIMALS

Leo J. Mullen, Campbellsport, Wis.

Application November 18, 1941, Serial No. 419,653

3 Claims. (Cl. 119—157)

The present invention relates to new and useful improvements in insecticide holders adapted for use in containing a quantity of insecticide and embodying means for attaching the holder in position to a tail of a cow or other animal.

A further object is to provide an attachment of this character of simple and practical construction, which is efficient and reliable in performance, relatively inexpensive to manufacture, and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout and in which:

Figure 1 is a view in elevation of the device shown in position on a cow's tail.

Figure 2 is a vertical sectional view thereof, and

Figure 3 is a top plan view.

Referring now to the drawing in detail wherein for the purpose of illustration I have disclosed a preferred embodiment of the invention, the numeral 5 designates a leather container preferably of spherical form and provided with a plurality of perforations 6. The container is adapted to hold a sponge 7 which may be saturated with a suitable insecticide which is discharged in limited quantities through the perforations 6.

The top of the container 5 is formed with a relatively large opening 8 to the edges of which are formed spaced parallel attaching straps 9 also having openings 10 formed therein.

Certain of the openings in one of the straps 9 are provided with pins 10 secured therein by flanges 11, the inner ends of the pins being adapted for insertion in the openings 10 in the opposite strap 9.

The remaining openings 10 in the straps 9 are adapted to receive lacing 12 which is threaded through the respective openings for securing the straps 9 to the hair of the tail of the animal 13 substantially at the central portion thereof.

After the sponge has been placed in position in the holder 5 the sponge may be saturated with a suitable insecticide through the use of an oil can or similar dispensing device having its spout projected through one of the openings 6 or through the opening 8 until the sponge has been saturated to the desired extent. During the movement of the animal's tail the insecticide will be discharged from the container and the various parts of the animal will be subjected to an application of the insecticide through the movement of the tail causing the container to strike the animal.

It is believed the details of construction, manner of use and advantages of the device will be readily understood from the foregoing without further detailed explanation.

Having thus described the invention what I claim is:

1. An insecticide holder adapted for attaching to a part of an animal and comprising a perforated container adapted to hold a sponge saturated with insecticide and attaching means projecting from the container for securing the latter in a desired position, said attaching means comprising a pair of flexible tongues arranged in parallel relation and adapted for receiving strands of hair of the animal therebetween, and connecting means for the tongues.

2. An insecticide container comprising a perforated leather bulbous member having an opening therein adapted to receive a sponge and also being adapted to receive a liquid insecticide for saturating the sponge, attaching straps projecting from the member, said attaching straps having openings therein and pins carried by the straps for insertion in said openings, said pins being adapted for projecting through strands of hair of an animal for securing the straps in a desired position on the animal.

3. An insecticide container comprising a perforated leather bulbous member having an opening therein adapted to receive a sponge and also being adapted to receive a liquid insecticide for saturating the sponge, attaching straps projecting from the member, said attaching straps having openings therein, pins carried by the straps for insertion in said openings, said pins being adapted for projecting through strands of hair of an animal for securing the straps in a desired position on the animal, and lacing connecting said straps together.

LEO J. MULLEN.